Patented June 17, 1947

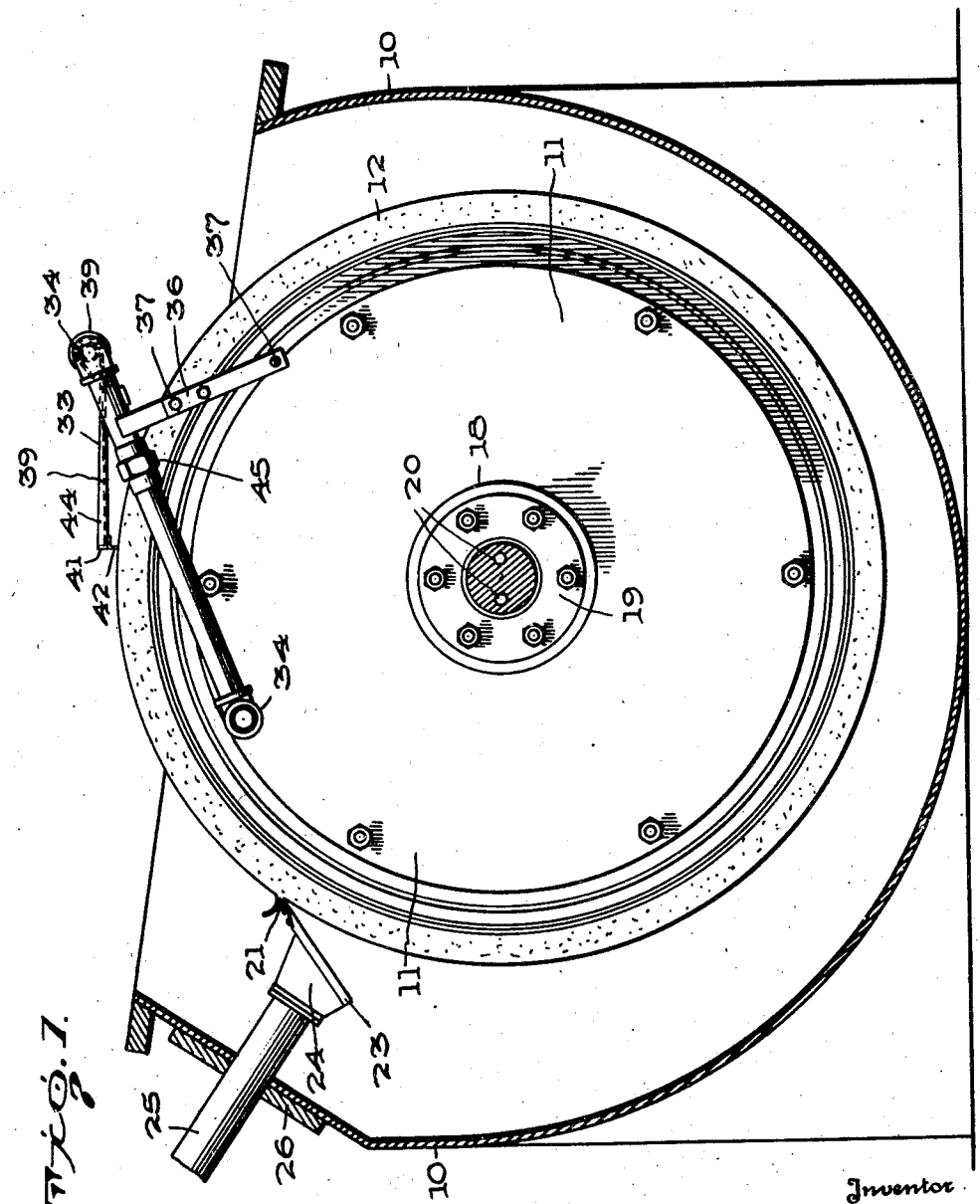

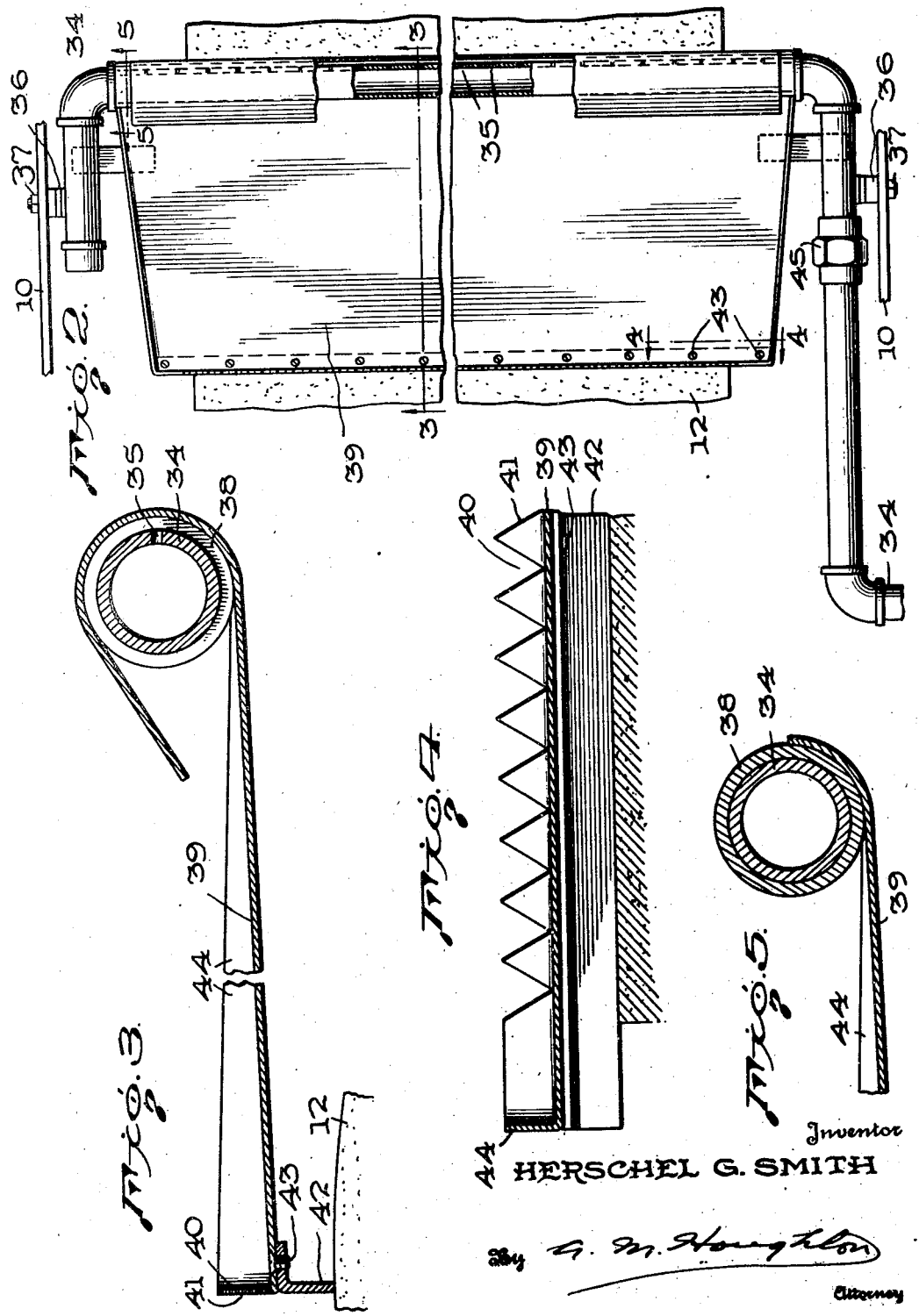

2,422,373

UNITED STATES PATENT OFFICE 2,422,373

ROTARY FILTER

Herschel G. Smith, Wallingford, Pa., assignor to Gulf Oil Corporation, Pittsburgh, Pa., a corporation of Pennsylvania Application August 18, 1943, Serial No. 499,125

8 Claims. (Cl. 210—199)

This invention relates to rotary filters of the type in which a layer of filter-aid is maintained on a rotating drum, the surface of said filter-aid being treated or washed by the application of liquid thereto, and progressively shaved therefrom for presentation of a fresh filter surface as the drum rotates.

More specifically, this invention relates to an improved means of applying liquid to the outer surface of the filtering medium, all as more fully described hereinbelow.

Rotary fillters are designed to separate the solids from an aggregate of solids and liquids and, in general, include a rotary drum, the surface of which is provided with a suitable perforated cover supported by a frame or grid on which is deposited a layer of solids or filter-aid such as diatomaceous earth, clay or other filtering medium. As is realized by those skilled in the art of carrying out the operations of industrial chemistry, many mixtures of materials dispersed in water, oil and other solutions or liquids may be separated by use of the continuous rotary filter. These operations may be aided by using air, steam, or some other gas above or below atmospheric pressure so as to produce a rapid filtering process.

The rotary precoat cylinder filtering method is unique in that it operates continuously and presents a new filtering surface at each revolution. The filtering medium consists of layers of diatomaceous earth, clay, or other porous material deposited on the filter drum from a prepared slurry fed into the filter tank. After the proper precoat has been placed on the drum, the liquid to be filtered is then fed continuously to the filter tank whereby as the drum revolves a pressure differential obtained by either applying a vacuum to the inside of the drum, or by pressure in a closed shell outside the drum, forces the liquid through the built-up filter medium, and deposits a thin layer of solids from a feed on the surface of the filter medium. The fluid capacity of the filter medium depends upon its porosity, which affects the flow of the filtrate, and on its ability to retain the solids from the filtering oil on its surface.

The filter medium with the filtering oil and solid deposits filtered from the liquid may be carried through a drying zone and washed before the top layer of the mat on the rotary drum is removed. A straight knife edge advantageously removes a layer of the surface material from the face of the revolving drum, as coated with the filtering medium, so as to develop for each revolution a fresh filter-aid surface for further operation. This knife edge, firmly held in place in a movable rack, is controlled by a gear arrangement, the setting of which can be controlled as desired, and is operated from the main drive shaft of the rotary filter so that the rate of digging into the surface of the coating material can be controlled at will. With materials that develop a coating of slimy, clogging material on the filter, which, of curse, will result in excessive tendency to clog the filter and the filter aid, the setting for dig-in rate of the knife edge is greater than with materials for which there is less tendency to clog the surface of the solids of the filtering medium. The amount of the filtering medium removed from the material on the rotating drum may be adjusted for the product being filtered.

The clay precoat or solid filtering surface may be any thickness from 0.1 to about 3.0 inches. Usually a depth gage is provided, which indicates the thickness of the precoat. When the rotary filter is operating the knife should not be allowed to contact the flannel filter cloth, stainless mesh, wire windings or bands of the rotary drum.

Before the start of the filtering operation, the top surface of the filter-aid mat is shaved off to a uniform thickness, and the optimum thickness of the total mat so conditioned is subject to control by the knife. Any excess or bulges of filtering medium mat would not conform with the mechanical adjustments for best operation unless first shaved off before the operation starts.

In one embodiment of this invention my new apparatus for distributing liquid to the precoat surface of rotary filters results in a more effective recovery by what I denominate the smear-wash system, in that the valuable material being processed would otherwise be lost to a greater extent as clay soakage in the contacting material that is removed from the filtering medium. By this system of "trading," it is possible to supplant filtrate which is retained in the surface of the filter-aid as soakage by low cost wash liquid so that the loss of the filterable liquid in shavings of the precoat is minimized. Thus the shaved-off material which is rejected predominantly contains low cost wash liquid rather than the higher cost and much more valuable material being processed.

Thus, I secure cumulative advantageous effects from the smear-wash apparatus improvement for rotary filters which have direct, as well as indirect, advantages in the whole filtering process; and therefore these effects are of considerable importance from the economic standpoint. With an increase in the filter rate I secure decreased soakage due to the fact that my improved rotary filter apparatus enables me to decrease the amount of contact material that has to be applied in the refining of a given product, as well as a reduction in the amount of the valuable material lost, due to the fact that my improvement enables me to apply the smear-wash system for the trading of low grade and inexpensive material for the costly high grade material that would otherwise be lost as clay soakage. Furthermore, I am enabled by this smear-wash apparatus to reduce the rate of rotation of the filter-aid due to the greater margin of filter capacity; and by thus running the filter at a slower rate of speed I can secure more effective drawing-out by a pressure differential of such liquid soakage as is found on the surface of the mat by the time it reaches the knife scraper.

This operation is likewise particularly valuable for the processing of special derivatives from mineral, vegetable or animal oils, such as, for example, clay contacting in the refining of sulphurized sperm oil.

In one application of my invention the accompanying drawings illustrate one specific embodiment thereof and are not to be construed as limitations for my improvement for use in combination with continuous or rotary filters. Referring to the accompanying drawings, in which like numbers of reference designate the same parts throughout the several views:

Figure 1 is an end view of a conventional rotary vacuum filter showing my smear-wash apparatus for distributing wash or other liquid to the surface of the filtering medium, and a blade for removing part of said filtering medium.

Figure 2 is an enlarged fragmentary top view of the smear-wash apparatus.

Figure 3 is an enlarged fragmentary sectional view, taken on the line 3—3 of Figure 2, of the liquid feed pipe, inclined pan, and smear bar which rests lightly on the filter medium.

Figure 4 is an enlarged sectional figure taken on the line 4—4 of Figure 2, showing lower extremity of the inclined pan and the V-notches and the flange of the pan which rests lightly on the surface of the filter medium, Figure 5 is a detail sectional figure taken on the line 5—5 of Figure 2, showing the method of separating the distributing feed pipe from the pan which partially encircles it at the upper extremity of the pan.

In the specific embodiment of the invention illustrated by Figures 1–5, the numeral 10 designates the tank of a conventional filter adapted to contain the liquid to be filtered. Usually, the tank 10 or shell is not subjected to a pressure greater than ½ pound per square inch, or a vacuum greater than 2 inches of mercury, although greater pressure variations are used in the trade.

Revolubly mounted in said tank 10 in a conventional manner is a drum 11. The drum 11 may be divided into a number of sections, each of which is a hollow member covered with a filter medium 12. The filter medium 12 may communicate through pipes with the trunnion 18 which may revolve against a wear plate 19 and division bridges to separate the wash from the filtrate. Of course, it is understood that the drum 11 may be rotated at a slow speed by any suitable or conventional mechanism (not shown) and that suction may be applied to the filtering medium 12 through the covering, the connecting pipes, and the trunnion 18, and finally to the wash or filtrate connections 20.

As the drum 11 revolves, the knife 21 removes the solid material separated from the liquid and also a small amount of the precoat material 12. The knife 21 may be mounted on a transverse bar 23 which may be supported by a connection brace 24 from support arms 25 extending through packed guides 26 in the shell 10 to a gearing arrangement (not shown) whereby the position of the knife can be controlled. The drum 11 of the rotary filter rotates and the knife 21 shaves off a small portion of the filtering medium 12 and entrained solids, thus presenting a new filtering surface on the outer surface of the filtering medium 12.

The liquid to be filtered by this filtering surface 12 is usually contacted inside the lower half of the tank 10. For example, as the drum 11 rotates counterclockwise the freshly scraped filter medium surface 12 passes through the liquid to be processed contained in the tank 10, and a difference in pressure forces the liquid to be processed through the filtering solids 12. The filtered liquid may pass through the filtering medium 12, and the many supports and attachments for it to outside connections 20 through pipes (not shown). When the filtering medium 12 revolves out of the liquid in the tank 10, suction may be applied to the cake 12 or some other treatment such as hot air, steam, or other gas may be applied. After the filtering medium 12 has revolved to some position near the top of the circumference of the circle of rotation, a wash liquid or some other liquid is applied to the surface of the filtering medium 12 by means of our improved smear-wash apparatus 33.

The smear-wash apparatus 33 comprises a pipe 34 to distribute the wash or other liquid through holes 35 located advantageously in the upper half of the pipe 34 which is mounted horizontally above the rotating drum 11 by means of support arms 36 secured to the ends of the outer shell 10 of the rotary filter with bolts 37, and which may be partially supported by the fixed and independently supported inlet section of the pipe at some convenient union 45. Partially encircling said pipe 34 and separated from it by means of conveniently spaced rings 38 is a pan 39 which catches the liquid as it flows out of the holes 35.

Figure 2 is an enlarged fragmentary top view of the liquid distributing pan 39 which is inclined enough so that the liquid flows down the pan 39 through a plurality of V-notches 40 (Figs. 3 and 4) cut in a vertical end-section 41 at the lower extremity of the pan 39 and down vertically over a smearing distributor angle-bar 42 which is attached to the pan 39 by means of flat-head screws 43 and which has a straight edge substantially coinciding with the surface of the filtering medium 12 deposited on the drum 11 of the rotary filter. On both sides of the inclined pan 39 are upright flanges 44 which reinforce it and keep the liquid from flowing over its sides into the tank 10. With this smear-wash apparatus 33 I accomplish the distribution of liquid over the entire surface of the filtering medium 12 and increase the filtering efficiency of continuous or rotary filters.

Having thus described my invention in detail, the improvements in efficiency of operation of rotary filters become apparent. The benefits obtained by my apparatus for distributing wash or other liquid to the surface of the filtering medium of rotary filters have been verified by actual tests. With the apparatus described hereinabove I have increased the efficiency of continuous rotary filters by obtaining a better wash liquid distribution to the entire area of the filtering medium contacted, and have obtained a better conditioning of the surface of the filtering medium than has heretofore been possible.

The main point with the smear-wash is that I have found it necessary to redesign or modify the regular filter-aid filter system when attempting to process material that filtered with great difficulty, for which the soakage is valuable, and which could not be regularly washed with full removal of soakage from the rejected contact clay and thin shaving of the filter-aid mat, due to the very slow penetration of the liquid through the solids, when operating on a very slow filtering material. The smear-wash system effected somewhat of a trading proposition for the soakage in the filtering layer. Thus, by this smear-wash, with but a small amount of liquid wash, such as, for example, a petroleum distillate of much lower value, the permitted distance of penetration of liquid between the line of smear-wash and the shaving blade location secures a sufficient rate of penetration so as to encounter a condition by which the bulk of the material of greatest value nearer the surface had sunk to a depth below the shaving effect. The soakage that is being shaved off at the surface, along with the slime and very small amount of the filter-aid medium itself, is then made up mostly of the type distillate applied by the smear-wash. Thus, I am enabled to apply a single operation to a difficultly filterable material, and at the same time throw away contact clay and a small amount of filter-aid shaved from the filter containing soakage made up mostly of low grade distillate. The smear-wash operation itself is of particular value for certain materials, for which a filtering clarifying operation must be applied, when very difficult to clarify or slow to pass through the filter medium.

The smear-wash apparatus for distributing liquid to the filtering medium surface of continuous or rotary filters can be used advantageously in a variety of filtering or processing operations. The liquid distributed may be miscible with or immiscible with the liquid being filtered. For instance, the wash liquid may be a soap-bearing water which can be used advantageously for some metallurgical operations. The same principle I have in mind is used by some oil producers to displace oil in sand by water with an added material affecting the surface or interfacial tension. These and other advantages of my apparatus for distributing liquid to the surface of the filtering medium of continuous or rotary filters and my improved process utilizing the apparatus, all as fully described hereinabove, become apparent to those skilled in the art of rotary filter operation.

What I claim is:

1. In combination with a continuous rotary filter comprising a moving filtering medium the surface of which is progressively removed with accumulated solids to continuously present a fresh surface for filtering, an inclined distributing member so mounted as to follow the progressive reduction in thickness of the filtering medium and formed adjacent its lower edge with an upstanding wall which is cut away adjacent the surface of said distributing member, a flange depending from such lower edge and resting in contact with the filtering medium surface, a source of wash liquid, and means for discharging liquid from said source onto said distributing member whereby the liquid is partly retained by the uncut portions of said upstanding wall and is uniformly distributed to the filtering medium surface.

2. In combination with a continuous rotary filter comprising a moving filtering medium the surface of which is progressively removed with accumulated solids to continuously present a fresh surface for filtering, an inclined distributing member so mounted as to remain in contact with the filtering medium as the same is reduced in thickness and having a depending flange in contact with said filtering medium surface, said distributing member having an upstanding wall adjacent its lower edge formed with openings through which liquid discharged onto said distributing member from a source of supply flows onto and over said depending flange and is spread thereby upon the filtering medium surface, and means communicating with the source of supply for discharging liquid onto said distributing member.

3. In combination with a continuous rotary filter comprising a moving filtering medium the surface of which is progressively removed with accumulated solids to continuously present a fresh surface for filtering, an inclined distributing member swingably mounted to rest with its lower edge on the filtering medium surface and formed adjacent its lower edge with an upstanding serrated wall and a depending flange, a source of liquid supply, and means communicating with said source for discharging liquid onto said member whereby it is distributed by the serrations in said wall for flow over said depending flange and is thereby evenly spread upon the filtering medium surface.

4. In combination with a continuous rotary filter comprising a moving filtering medium which is progressively and gradually reduced in thickness by removal of thin sections of its surface, an inclined distributing member swingably mounted to rest with its lower edge on the filtering medium surface as the same recedes by its progressive reduction in thickness, said distributing member being formed adjacent its lower edge with an upstanding wall and a depending flange, said upstanding wall being formed with uniformly spaced upwardly diverging openings originating substantially in the plane of the inclined surface of said distributing member, a source of liquid supply, means communicating with said source for discharging liquid onto said distributing member at a high point thereon to flow thereover and through the openings in said upstanding wall, thereby equalizing the distribution of liquid throughout the length of said depending flange so that it is spread uniformly thereby upon said filtering medium surface and to avoid channeling of such surface.

5. In combination with a rotary drum filter, a tubular conduit communicating with a source of supply for conveying liquid from such source to the surface of the filter, means for mounting said conduit at a higher level than the drum and to extend longitudinally thereof, discharge openings formed in said conduit above the bottom thereof, a distributor member comprising an apron, one longitudinal edge of which is curved upwardly to constitute a hood surrounding said conduit in the region of the discharge openings and spaced therefrom, means for pivotally mounting said distributor member to extend at an incline into contact with the surface of said drum, and auxiliary distributing means carried by said member in contact with surface of said drum for spreading liquid evenly upon the drum surface.

6. In combination with a continuous rotary filter comprising a drum coated with filter aid material which is progressively removed in a thin continuous layer by the automatic advance of a shaving knife, a source from which wash liquid is supplied to the region of the filter aid surface which carries accumulated solids thereon, liquid discharging means communicating with said source and positioned above the drum, a distributing member arranged to receive wash liquid discharge from said means and to contact said filter aid surface continuously as the same decreases in thickness, and distributing means carried by said member for causing flow of the wash liquid onto the contaminated filter aid surface evenly and without disrupting such surface in advance of the shaving knife, whereby such knife removes all collected solids in a cut which is sufficiently thin to economize consumption of the underlying filter aid material, and removes only a superficial layer thereof in which recoverable filtrate has been displaced by wash liquid.

7. In combination with a continuous rotary filter comprising a drum coated with filter aid material which is progressively removed in a thin continuous layer by the automatic advance of a shaving knife, a source from which wash liquid is supplied to the region of the filter aid surface which carries accumulated solids thereon, liquid discharging means communicating with said source and positioned at a fixed level above said drum, an inclined distributing member pivoted with respect to said liquid discharging means and adapted to rest continuously with an edge upon the filter aid surface as the same decreases in thickness, and means at the lower edge of said distributing member for spreading the wash liquid upon the filter aid surface evenly and without disrupting such surface in advance of the shaving knife, whereby such knife removes filtered solids in a cut which is sufficiently thin to economize consumption of the underlying filter aid material and removes only a superficial layer thereof in which recoverable filtrate has been displaced by wash liquid.

8. In combination with a continuous rotary filter comprising a drum coated with filter aid material which is progressively removed in a thin continuous layer by the automatic advance of a shaving knife, a perforated pipe mounted to extend longitudinally of the drum above its surface and connecting with a source of wash liquid, an inclined distributing member partly encircling said pipe and swingable thereabout to rest with its lower edge upon said filter aid surface at a position in advance of the knife, in the direction of rotation of the drum, said distributing member being formed adjacent its lower edge with a wall which is broken away at intervals to permit liquid discharged upon said member to be distributed uniformly thereby and in such manner as not to disrupt the filter aid surface in advance of the shaving knife, whereby such knife removes all collected solids in a cut which is sufficiently thin to economize consumption of the underlying filter aid material, and removes only a superficial layer thereof in which recoverable filtrate has been replaced by wash liquid.

HERSCHEL G. SMITH.

REFERENCES CITED

The following references are of record in the file of this patent:

UNITED STATES PATENTS

| Number | Name | Date |
|---|---|---|
| 949,724 | Bebbington | Feb. 15, 1910 |
| 2,051,079 | Faber et al. | Aug. 18, 1936 |
| 2,131,303 | Selund | Sept. 27, 1938 |
| 1,515,130 | Morrison | Nov. 11, 1924 |
| 1,198,880 | Wagner | Sept. 19, 1916 |
| 1,666,279 | Boykin | Apr. 17, 1928 |
| 2,072,586 | Grant | Mar. 2, 1937 |
| 2,243,311 | Ditzen | May 27, 1941 |
| 1,268,865 | Meyer | June 11, 1918 |
| 2,092,111 | Dons et al. | Sept. 7, 1937 |
| 2,227,239 | Wieneke | Dec. 31, 1940 |

FOREIGN PATENTS

| Number | Country | Date |
|---|---|---|
| 333,577 | Germany | Mar. 2, 1921 |